United States Patent
Sakamoto et al.

(10) Patent No.: US 6,169,347 B1
(45) Date of Patent: Jan. 2, 2001

(54) ROTATING COIL ELECTROMAGNETIC CLUTCH

(75) Inventors: Hiroyasu Sakamoto, Chiryu; Junichi Ohguchi, Toyoake; Yuuichi Aoki, Chita-gun, all of (JP)

(73) Assignee: Denso Corporation, Kariya (JP)

( * ) Notice: Under 35 U.S.C. 154(b), the term of this patent shall be extended for 0 days.

(21) Appl. No.: 09/431,318

(22) Filed: Nov. 2, 1999

(30) Foreign Application Priority Data

Nov. 9, 1998 (JP) .................................................. 10-317984

(51) Int. Cl.$^7$ ....................................................... H02K 7/10
(52) U.S. Cl. ............................. 310/78; 310/105; 192/84.95
(58) Field of Search ............................. 310/78, 105, 220, 310/232, 233, 239, 248; 192/84.95

(56) References Cited

U.S. PATENT DOCUMENTS

| | | | |
|---|---|---|---|
| 4,295,553 | * 10/1981 | Sayo et al. | 192/84.961 |
| 4,347,453 | * 8/1982 | Gaus | 310/104 |
| 4,404,488 | * 9/1983 | Herr | 310/239 |
| 4,476,410 | * 10/1984 | Wolcott | 310/228 |
| 4,649,305 | * 3/1987 | Morrill | 310/72 |
| 4,649,307 | * 3/1987 | Bech | 310/99 |
| 4,770,061 | * 9/1988 | Martinez | 475/154 |
| 5,306,974 | * 4/1994 | Bates | 310/68 R |
| 5,691,590 | * 11/1997 | Kawai et al. | 310/180 |
| 5,997,666 | * 11/1999 | Horski et al. | 310/51 |
| 6,012,563 | * 1/2000 | Aoki et al. | 192/84.951 |

FOREIGN PATENT DOCUMENTS

| | | |
|---|---|---|
| 1-131028 | 9/1989 | (JP) . |
| 2-54928 | 4/1990 | (JP) . |
| 10-176726 | 6/1998 | (JP) . |

* cited by examiner

Primary Examiner—Nestor Ramirez
Assistant Examiner—Joseph Waks
(74) Attorney, Agent, or Firm—Pillsbury Madison & Sutro LLP

(57) ABSTRACT

An electromagnetic coil is disposed in a rotor, and electrically insulated from the rotor. A slip-ring is supported by a rotor through a slip-ring supporter, and rotates with the rotor. A brush is supported by a compressor boss portion through a brush supporter, and supplies an electric current to the slip-ring. A diode is disposed in the brush supporter or the slip-ring supporter, and absorbs a surge voltage which is inducted when said electromagnetic coil is disenergized.

13 Claims, 11 Drawing Sheets

ROTATING COIL ELECTROMAGNETIC CLUTCH

CROSS REFERENCE TO RELATED APPLICATION

This application is based on and incorporates herein by reference Japanese Patent Application No. Hei. 10-317984 filed on Nov. 9, 1998.

BACKGROUND OF THE INVENTION

1. Field of the Invention

The present invention relates to an electromagnetic clutch suitable for use in a compressor of an automotive air conditioning system.

2. Description of Related Art

JP-U-1-131028 and JP-U-2-54928 disclose an electromagnetic clutch in which an electromagnetic coil is provided in a rotor.

In such an electromagnetic clutch, an electric current supplied to the electromagnetic coil is large, thereby increasing a surge voltage (reverse voltage) which is induced when the clutch is deenergized. Thus, it is necessary to connect a surge voltage absorption element such as diode in parallel with the electromagnetic coil. For example, JP-A-10-176726 discloses a diode connected in parallel with an electromagnetic coil.

However, in JP-A-10-176726, the electromagnetic coil is fixed in a stator. An installation portion into which the diode is installed is integrally formed in a bobbin around which the coil is wound, and axially protrudes toward the outside of the stator. The starting point and end point of the coil are electrically connected to the diode in the installation portion.

This layout, disclosed in JP-A-10-176726 and used for an electromagnetic clutch with a fixed coil cannot be applied to an electromagnetic clutch with a rotating coil. When the layout is applied to a rotating coil clutch, the axially protruding installation portion must be formed at the outer surface of the rotor in which the electromagnetic coil is provided. In a rotating coil clutch, the protruding installation portion will also rotate, and cannot avoid contacting a compressor housing around the installation portion.

SUMMARY OF THE INVENTION

An object of the present invention is to provide a rotating coil clutch in which a surge voltage absorbing element is provided without increasing an axial dimension thereof.

According to a first aspect of the present invention, a slip-ring rotating with a rotor is attached in the rotor. A brush supplying electric current to the slip-ring is supported by a brush supporter fixed to a fixed member. A surge voltage absorbing element is disposed in the brush supporter.

In this way, as the surge voltage absorbing element is disposed in the brush supporter, it is not necessary to form an axial protrusion portion for installing the surge voltage absorbing element. Thus, the surge voltage absorbing element can be provided without increasing the axial dimension of the electromagnetic clutch, thereby avoiding enlargement of the electromagnetic clutch and the device it is coupled to.

According to a second aspect of the present invention, a surge voltage absorbing element is installed in a support for the slip-ring. As a result, similarly to the first aspect of the present invention, it is not necessary to form an axial protrusion portion for installing the surge voltage absorbing element. Thus, the surge voltage absorbing element can be provided without increasing the axial dimension of the electromagnetic clutch, thereby avoiding enlargement of the electromagnetic clutch and the device it is coupled to.

According to a third aspect of the present invention, a surge voltage absorbing element is disposed abutting an electromagnetic coil in a rotor. As a result, similar to the first and second aspects of the present invention, it is not necessary to form an axial protrusion portion for installing the surge voltage absorbing element. Thus, the surge voltage absorbing element can be provided without increasing the axial dimension of the electromagnetic clutch, thereby avoiding enlargement of the electromagnetic clutch and the device it is coupled to. Additionally, since the surge voltage absorbing element is placed near the electromagnetic coil, the surge voltage absorbing element can be directly connected to both ends of the electromagnetic coil.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
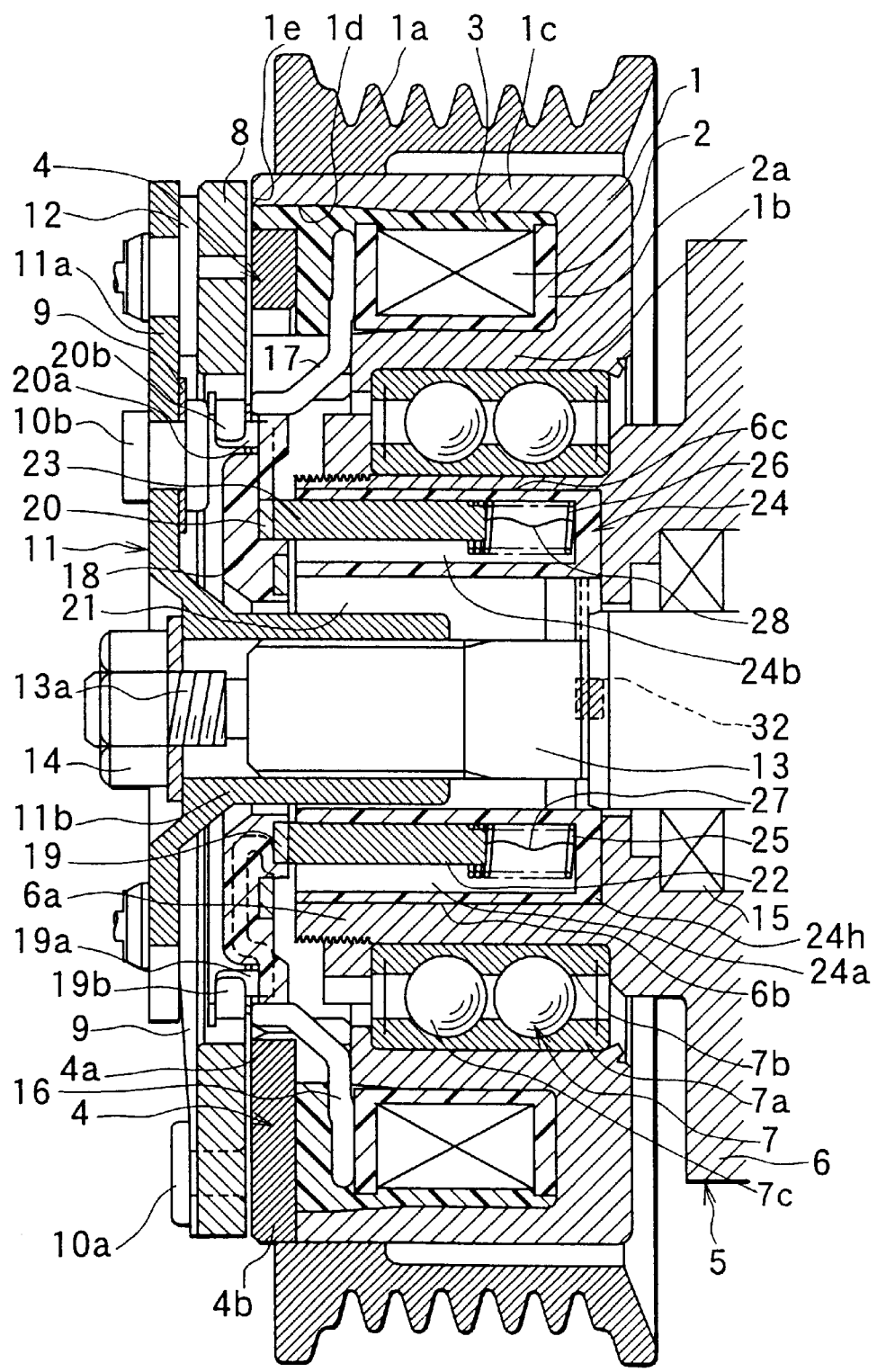
FIG. 1 is a cross-sectional view showing an electromagnetic clutch (first embodiment)

In the first embodiment, an electromagnetic clutch is attached to a refrigerant compressor 5 of an automotive air conditioning system. FIG. 1 shows a cross-sectional view of the electromagnetic clutch.

The electromagnetic clutch includes a rotor 1, an electromagnetic coil 2, a friction plate 4, a ball bearing 7, an armature 8, and a hub 11.

The rotor 1 includes a pulley 1a around which a multi-stage V-belt (not illustrated) is wrapped, and rotates with the vehicle engine through the V-belt. The rotor 1 is made of magnetic material such as low carbon steel, and is formed into a cross-sectional U-shaped double-ring to have an inner cylindrical portion 1b, an outer cylindrical portion 1c, and a ring-like concave portion 1d therebetween. The rotor 1 further defines a friction surface 1e at its axial front end.

The electromagnetic coil 2 is installed in the concave portion 1d of the rotor 1. The electromagnetic coil 2 is wound around a bobbin 2a made of resin, and is fixed to the concave portion 1d through an insulation member 3 made of resin. Thus, the electromagnet coil 2 rotates together with the rotor 1.

The friction plate 4 is made of magnetic material such as low carbon steel, and is formed as a ring. The friction plate 4 includes a plurality of projections 4a protruding radially inwardly and projections 4b protruding radially outwardly. The friction plate 4 is fixed to the axial front ends (left end in FIG. 1) of the inner and outer cylindrical portions 1b and 1c at these projections 4a and 4b.

The compressor 5 includes a front housing 6 disposed at the electromagnetic clutch. The front housing 6 is made of aluminum, and integrally defines a cylindrical boss portion 6a protruding axially frontwardly. In this embodiment, the compressor 5 is a refrigerant compressor for an automotive air conditioning system, and may be any of the well-known swash plate compressor, vane compressor, scroll compressor, or the like.

A ball bearing 7 is inserted into the inner periphery of the rotor 1. The rotor 1 is rotatably supported on the cylindrical boss portion 6a of the front housing 6 through the ball bearing 7. The ball bearing 7 includes an outer race 7a fixed to the inner periphery of the rotor 1, an inner race 7b fixed to the outer periphery of the boss portion 6a, and balls 7c rotatably supported between the outer and inner races 7a and 7b.

The armature 8 is placed facing to the friction surface 1e of the rotor 1 and the friction plate 4 with a predetermined slight gap. The armature 8 is made of magnetic material such as iron and formed as a ring-shaped plate. When the electromagnetic coil 4 is not energized, the armature 8 is held by the spring force of plural plate springs 9 to be separated by the predetermined slight gap from the friction surface 1e of the rotor 1.

The plate springs 9 are long and thin. One end of each plate spring 9 is connected to the armature 8 by a rivet 10a, and another end thereof is connected to the hub 11 by a rivet 10b.

The hub 11 is made of iron, and includes a disc portion 11a and a cylindrical portion 11b. A stopper 12 made of elastic material such as rubber is attached to the radially outer area of the disc portion 11a. When the electromagnetic coil 2 is not energized, the stopper 12 sets the axial position of the armature 8. Further, the armature 8 is axially pushed from the rear surface of the disc portion 11a toward the rotor 1 by the thickness of the stopper 12, so that the plate spring 9 elastically transforms. Thus, a spring force arises in the plate spring 9, and holds the armature 8 at the axial predetermined position when the clutch is not energized.

The cylindrical portion 11b of the hub 11 is spline-connected to the rotational shaft 13 of the compressor 5. Further, a nut 14 is screwed to a front-end external thread 13a of the rotational shaft 13 to connect the hub 11 to the rotational shaft 13. A lip seal 15 is provided between the front housing 6 and the rotational shaft 13 to prevent lubrication oil and refrigerant in the compressor 5 from leaking outside.

A circuit supplying an electric current to the electromagnetic coil 2 rotating with the rotor 1 will be explained. In the present embodiment, a positive slip-ring 19, a negative slip-ring 20, and brushes 22, 23 are provided inside the compressor boss portion 6a, to conduct electric current to coil 2.

In the concave portion 1d of the rotor 1, a wind start terminal and a wind end terminal of the electromagnetic coil 2 are taken out toward the friction surface 4 (armature 8) from the bobbin 2a. A positive electrode side lead 16 is connected to one of these terminals, and a negative electrode side lead 17 is connected to another terminal. As shown in FIG. 1, the leads 16 and 17 are disposed symmetrically at about 180 degree intervals in the ciucumferential direction.

Figure 2:
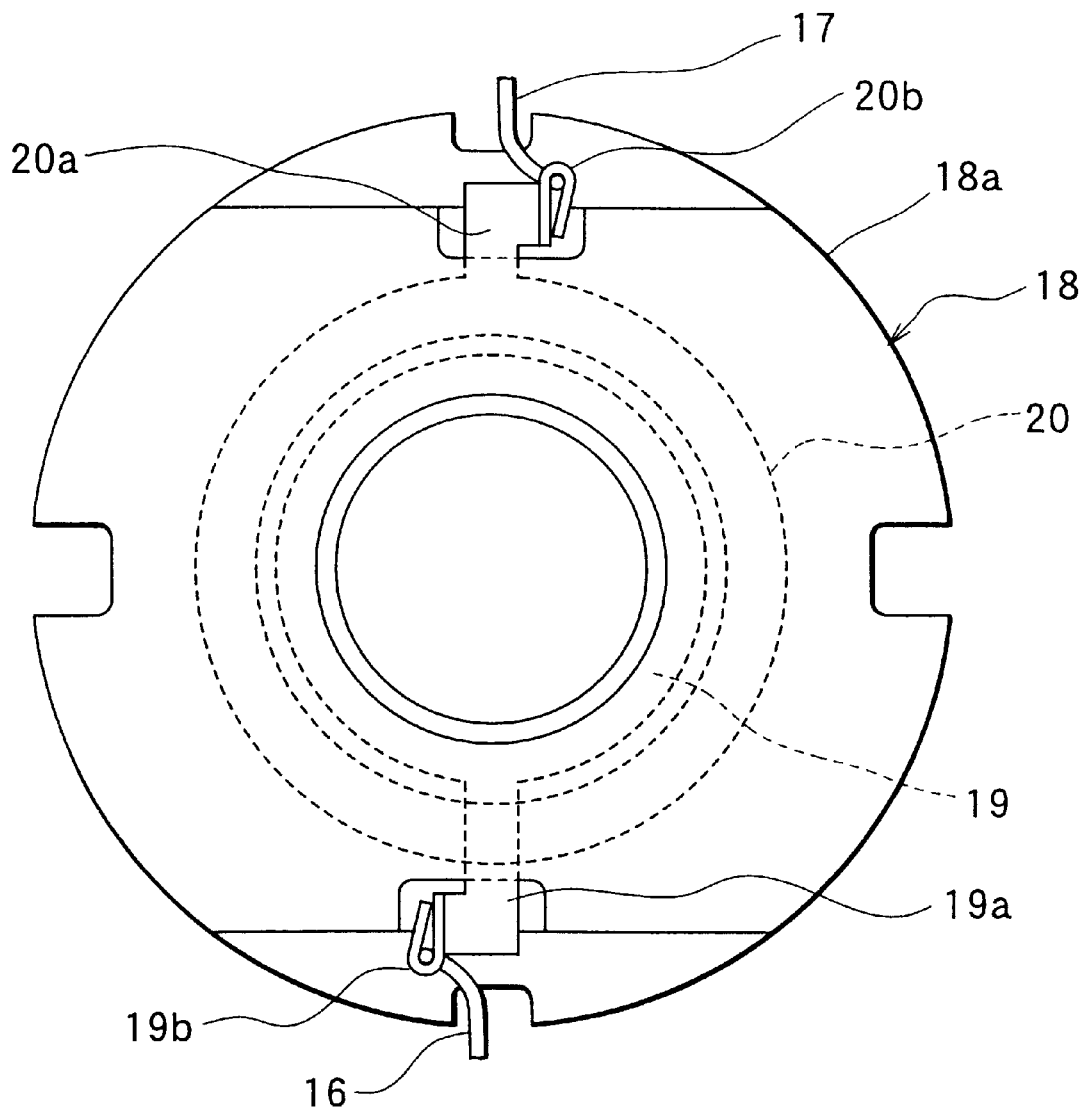
FIG. 2 is a front view showing a slip-ring (first embodiment)

A slip-ring supporter 18 is provided inside the rotor 1. The slip-ring supporter 18 is made of electric insulation material such as resin, and extends in the radial direction of the rotor 1. The positive slip-ring 19 and the negative slip-ring 20 are attached to slip-ring supporter 18. As shown in FIG. 2, the diameter of the positive stop-ring 19 is set smaller than the diameter of the negative slip-ring 20. Both slip-rings 19 and 20 are concentrically disposed, and insert-formed in the slip-ring supporter 18.

The outer periphery of the slip-ring supporter 18 is adhered to a concave groove (not illustrated) formed in the inner cylindrical portion 1b of the rotor 1. Thus, the slip-ring supporter 18 is fixed to the inner cylindrical portion 1b, and rotates with the rotor 1.

Both slip-rings 19 and 20 are made of conductor metal such as copper. The positive slip-ring 19, disposed radially inward, includes a positive electrode terminal 19a, and the negative slip-ring 20, disposed radially outward, includes a negative electrode terminal 20a. The positive and negative electrode terminals 19a and 20a are integrally cut-formed or press-formed in the positive and negative slip-rings 19 and 20 respectively.

The positive and negative electrode terminals 19a and 20a are disposed symmetrically at 180 degree intervals in the circumferetial direction of the clutch.

The positive electrode terminal 19a extends radially outwardly from the outer periphery of the positive stop-ring 19, and integrally includes a bent portion 19b bending radially inwardly at the end thereof. The end of the positive electrode side lead 16 is mechanically connected to the bent portion 19b and soldered. Thus, the positive electrode terminal 19a is mechanically and electrically connected to the positive electrode side lead 16.

Similarly, the negative electrode terminal 20a includes a bent portion 20b. The bent portion 20b is also mechanically and electrically connected to the negative electrode side lead 17. Here, an electric insulation material (insulation varnish) is coated on the surfaces of each connection between the terminal 19a, 20a and the bent portion 19b, 20b respectively.

A cylindrical space 21 is formed between the cylindrical portion 11b of the hub 11 and the inner surface of the boss portion 6a. The positive and negative side brushes 22, 23 and a brush supporter 24 are disposed in the space 21.

Figure 3:
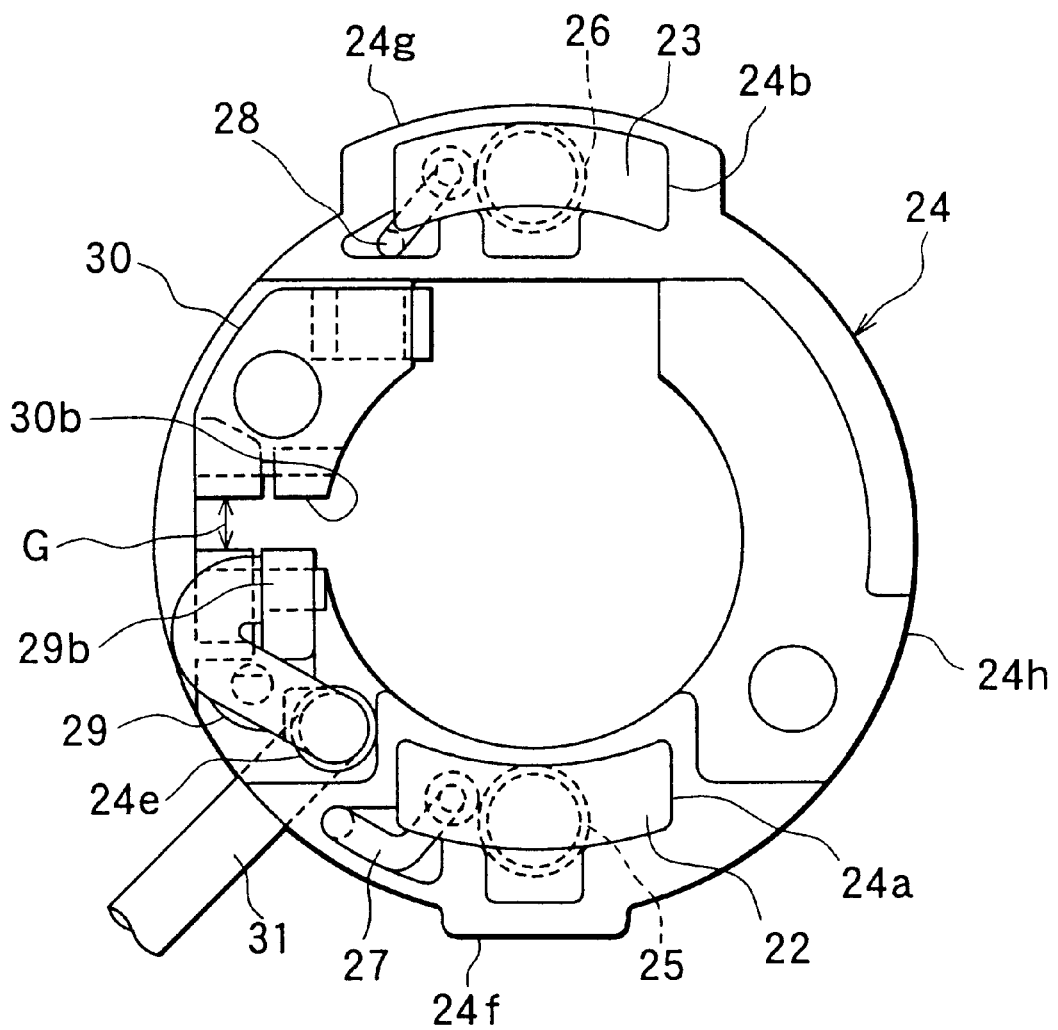
FIG. 3 is a front view showing a brush supporter (first embodiment)
Figure 4:
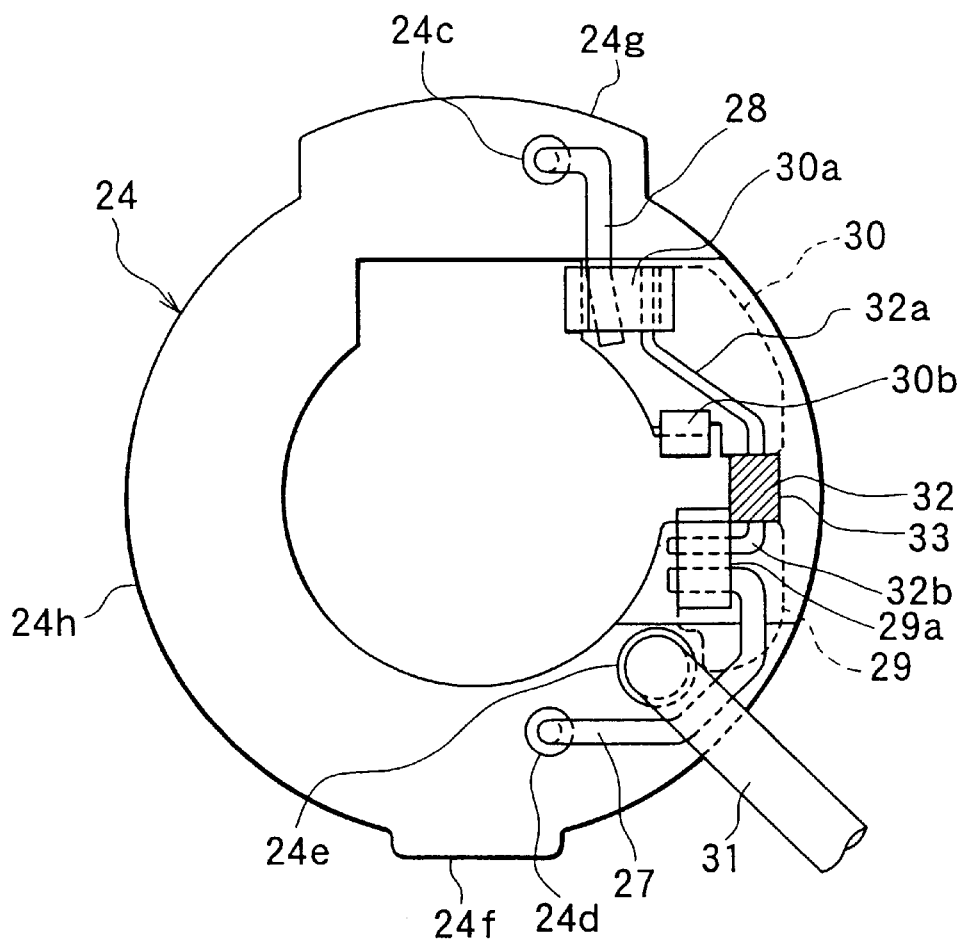
FIG. 4 is a back view showing a brush supporter (first embodiment)

FIGS. 3 and 4 show the brushes 22, 23 and the brush supporter 24. FIG. 3 is a front view showing the brushes 22, 23 and the brush supporter 24 when viewed from the left side in FIG. 1, and FIG. 4 is a back view showing them when viewed from the right side in FIG. 1. The brush supporter 24 is made of electric insulation material such as resin, and includes a ring-shaped bottom surface 24h. As shown in FIG. 3, the brush supporter 24 includes two cross-sectional arc-shaped brush installation concave portions 24a and 24b at about 180 degree intervals in the circumferential direction thereof. As shown in FIG. 1, the axial dimensions (depths) of the brush installation concave portions 24a and 24b are substantially same as the axial length of the brush supporter 24.

The brushes 22 and 23 are formed into cross-sectional arc shapes and are positioned in the brush installation concave portions 24a and 24b. The positive side brush 22 is installed in one brush installation concave portion 24a to slide in the axial direction. A coil spring 25 is provided between the rear end of the positive side brush 22 and the bottom surface of the brush installation concave portion 24a to urge the brush 22 frontwardly. Thus, the front end of positive side brush 22 is biased against the positive electrode side slip-ring 19 by the spring force of the coil spring 25.

The negative side brush 23 is installed in brush installation concave portion 24b to slide in the axial direction. A coil spring 26 is provided between the rear end of the negative side brush 23 and the bottom surface of the brush installation concave portion 24b to urge the brush 23 frontwardly. Thus, the front end of the negative electrode side brush 23 is biased against the negative electrode side slip-ring 20 by the spring force of the coil spring 26

The brush supporter 24 has two projections 24f and 24g, which extend in the radial direction over the length of the brush supporter 24, at the outer surface thereof where the brush installation concave portions 24a and 24b are formed. The projections 24f and 24g are formed symmetrically at 180 degree circumferential intervals. The boss portion 6a has two grooves 6b and 6c at the inner surface thereof, into which the projections 24f and 24g are installed. In this way, the brush supporter 24 is circumferentially positioned with respect to the inner surface of the boss portion 6b.

The positive side lead 27 and the negative side lead 28 are electrically connected to the positive electrode side brush 22 and the negative side brush 23, respectively. Each of the other ends of the leads 27 and 28 extends, as shown in FIG. 4, toward the compressor 5 through a hole 24d, 24c of the bottom surface of the brush installation concave portion 24a and 24b respectively.

A positive side segment 29 and a negative side segment 30 are integrally insert-formed in the bottom surface 24h of the brush supporter 24. Both segments 29 and 30 are made of conduction metal such as copper, aluminum or the like, and are exposed to both sides of the bottom surface 24h. That is, the segments 29 and 30 are exposed to the side of the brushes 22, 23 shown in FIG. 3, and the side of the compressor 5 shown in FIG. 4.

The segments 29 and 30 are, as shown in FIG. 3, disposed relatively near each other, however a predetermined gap G is provided between them to electrically insulate one from the other.

The positive side segment 29 includes a first bent portion 29a at the compressor 5 side thereof. The first bent portion 29a is mechanically and electrically connected and soldered to the other end of the positive side lead 27.

Similarly, the negative side segment 30 includes a first bent portion 30a at the compressor 5 side thereof. The first bent portion 30a is mechanically and electrically connected and soldered to the other end of the negative side lead 28.

The positive side segment 29 further includes a second bent portion 29b (see FIG. 3) at the brushes 22, 23 side thereof. The second bent portion 29b is mechanically and electrically connected and soldered to a lead 31 to connect with an outside control circuit (see FIG. 6). The lead 31 extends through a hole 24e of the bottom portion 24h of the brush supporter 24, and to the compressor 5 side.

The negative side segment 30 further includes a second bent portion 30b having a flat face at the compressor 5 side of the bottom portion 24h of the brush supporter 24. The flat face of the bent portion 30b is press-contacted to the outer surface of the compressor 5, so that the negative side segment 30 is directly grounded on a vehicle body through the front housing 6 made of metal (aluminum).

Figure 5:
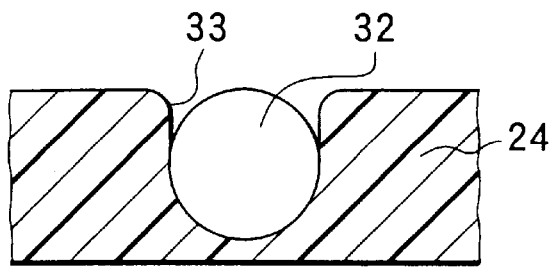
FIG. 5 is an enlarged view showing a diode installation portion (first embodiment)

A diode 32 is provided at the compressor 5 side of the bottom portion 24h to absorb a surge voltage. A concave portion 33 is formed between the first bent portions 29a and 30a, in the bottom portion 24h for holding the diode 32. The concave portion 33 is formed to hold the cylindrical diode 32, and has a width that is a little smaller than the outer diameter of the diode 32. Thus, the diode 32 is, as shown in FIG. 5, press-installed in the concave portion 33.

A negative lead 32b of the diode 32 is mechanically and electrically connected to the positive side lead 27 at the bent portion 29a, and similarly, a positive lead 32a of the diode 32 is connected to the negative lead 28 at the bent portion 30a. Here, electrical insulation material such as insulation varnish is coated on each connection surface of the bent portion 29a, 29b and 30a, after components are connected, to provide electrical insulation.

Figure 6:
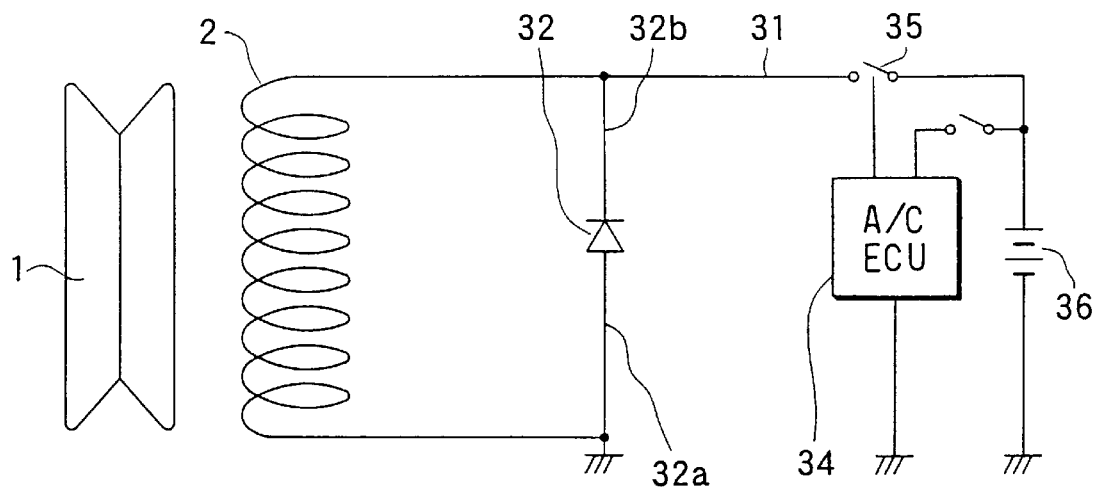
FIG. 6 shows an electric connection in the electromagnetic clutch (first embodiment)

The diode 32 is, as shown in FIG. 6, connected in parallel with respect to the electromagnetic coil 2 such that the polarity thereof is opposite to the polarity of the coil 2, to absorb the surge voltage which is induced when the coil 2 is deenergized. Thus, the positive lead 32a of the diode 32 is connected to the negative side segment 30, and the negative lead 32b is connected to the positive side segment 29.

Here, as shown in FIG. 6, the positive lead 31 is connected to a vehicle battery 36 through a relay 35 controlled by a control circuit 34 of the automotive air-conditioning system.

An operation of above-described electromagnetic clutch will be explained.

The rotor 1 is rotatably supported on the outer periphery of the boss portion 6a through the bearing 7. Thus, when the vehicle engine (not illustrated) rotates, the rotation force thereof is transmitted to the pulley 1a through the V-belt, and the rotor 1 and electromagnetic coil 2 rotate.

The leads 16 and 17, the slip-ring supporter 18, and the slip-rings 19 and 20 rotate with the rotation of the rotor 1 and the electromagnetic coil 2. In contrast, the brushes 22 and 23, the brush supporter 24, and the coil springs 25 and 26 are fixed to the boss portion 6a, and do not rotate. Thus, the front surfaces of the brushes 22 and 23 are press-contacted to the rotating slip-rings 19 and 20 by the spring force of the coil springs 25 and 26, and slide with respect to the slip-rings 19 and 20.

When the control circuit 34 closes the relay 35 for operating the compressor 5, the electric voltage of the vehicle battery 36 is impressed across the electromagnetic coil 2 through the electric supply circuit, and electric current is supplied to the coil 2. Then, the armature 8 is magnetically attracted to the friction surface 1e of the rotor 1 and the friction plate 4 against the axial elastic force (leftward force in FIG. 1) of the plate spring 9.

As a result, the rotor 1, the armature 8, the plate spring 9, and the hub 11 rotate together. Thus, the rotation of the rotor 1 is transmitted to the rotational shaft 13 through the hub 11, and the compressor 5 operates.

To stop the operation of the compressor 5, the control circuit 34 opens the relay 35 to deenergize the electromagnetic coil 2. As a result, the axial elastic force of the plate spring 9 separates the armature 8 from the friction surface le of the rotor 1 and the friction plate 4, thereby disconnecting the rotor 1 from the shaft 13 of the compressor 5. As a result, the operation of the compressor 5 is stopped.

When the electromagnetic coil 2 is deenergized, a surge voltage (reverse voltage) is induced due to the reactance of the coil 2. However, the surge voltage discharges through the diode 32, thereby absorbing the surge voltage. Here, an appropriate resistance may be connected in series with the diode 32 to improve the disengagement of the electromagnetic clutch.

According to the present embodiment, the diode 32 is installed in the concave portion 33 formed in the brush supporter 24. Thus, the axial dimension of the electromagnetic clutch is not increased despite the addition of the diode 32. Further, the brush supporter 24 is fixed to the front housing 6. Thus, the diode 32 does not rotate and does not contact the compressor housing 6.

(Second Embodiment)

Figure 7:
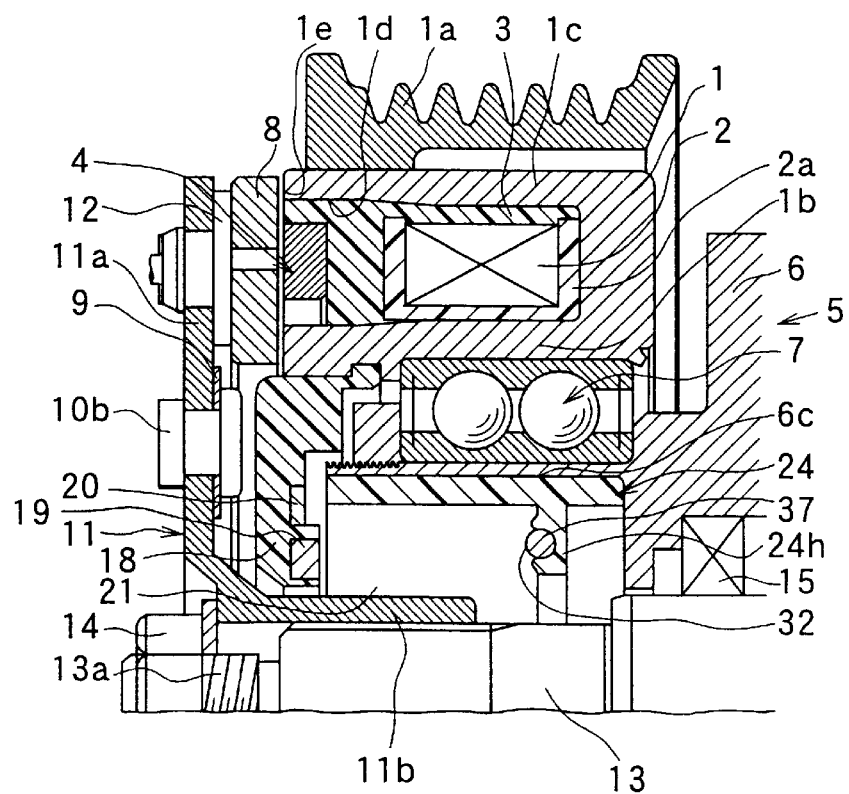
FIG. 7 is a cross-sectional view showing an electromagnetic clutch (second embodiment)

In the second embodiment, as shown in FIG. 7, a concave portion 37 is formed at the inside wall (brush side wall) of the bottom surface 24h of the brush supporter 24. The diode 32 is press-installed in the concave portion 37.

The diode 32 is disposed at the circumferential center between the brushes 22 and 23 to prevent the diode 32 from contacting the coil springs 25 and 26.

(Third Embodiment)

Figure 8:
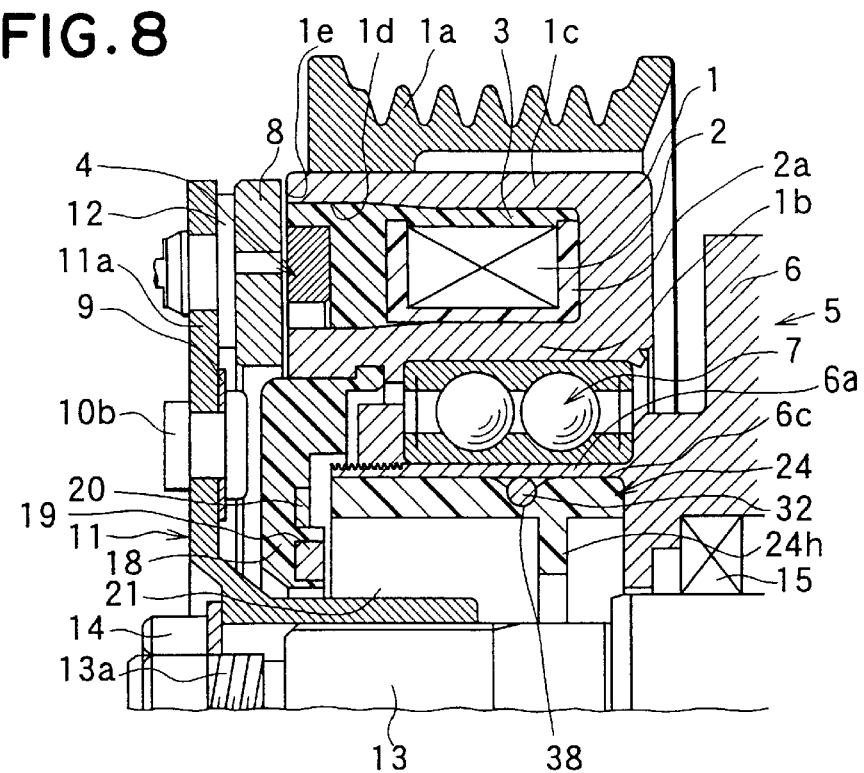
FIG. 8 is a cross-sectional view showing an electromagnetic clutch (third embodiment)

In the third embodiment, as shown in FIG. 8, a concave portion 38 is formed at the outside wall of the brush supporter 24 to face the inner surface of the boss portion 6a. The diode 32 is press-installed in the concave portion 38. As in the second embodiment, the diode 32 is disposed at the circumferential center between the brushes 22 and 23.

Figure 9:
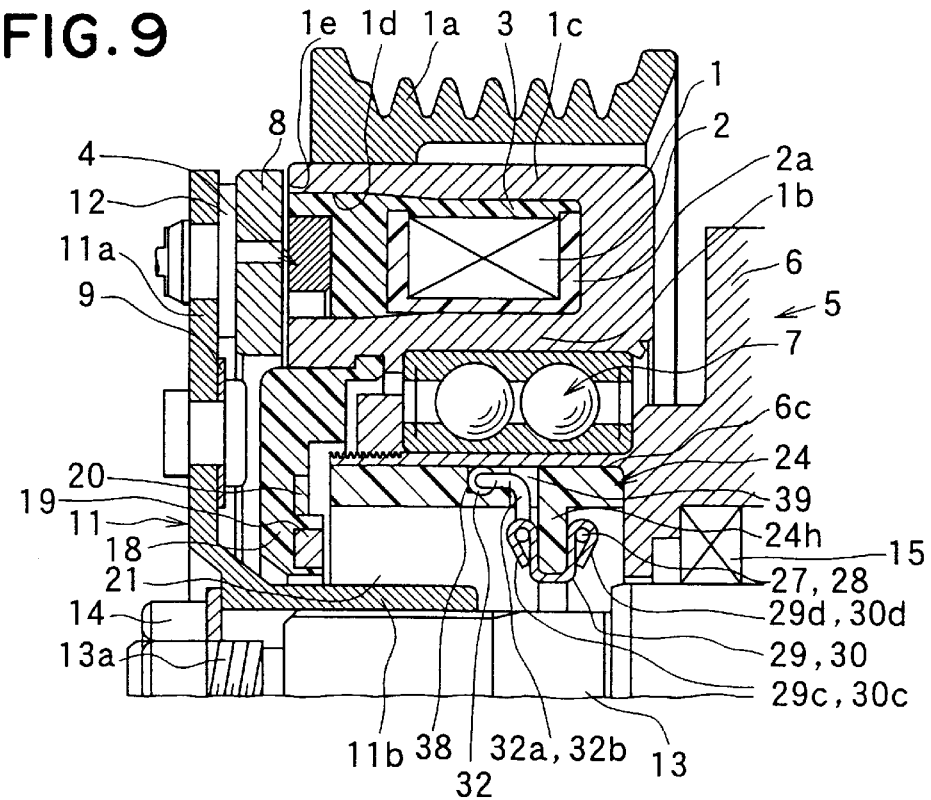
FIG. 9 is a cross-sectional view showing an electric connection in a diode (third embodiment)

FIG. 9 shows an electric lead layout for the diode 32 in the third embodiment. A hole 39 through which the leads 32a and 32b of the diode 32 extend is radially formed at the outside wall of the brush supporter 24. The positive and negative side segments 29 and 30 are insert-formed in the bottom portion 24h of the brush 24. Segments 29, 30 include inside bent portions 29c, 30c and outside bent portions 29d, 30d, respectively. Leads 32a, 32b of the diode 32 are connected to the inside bent portions 29c, 30c, respectively. Leads 27, 28 from the brushes 22, 23 are connected to the outside bent portions 29d, 30d, respectively.

(Fourth Embodiment)

Figure 10:
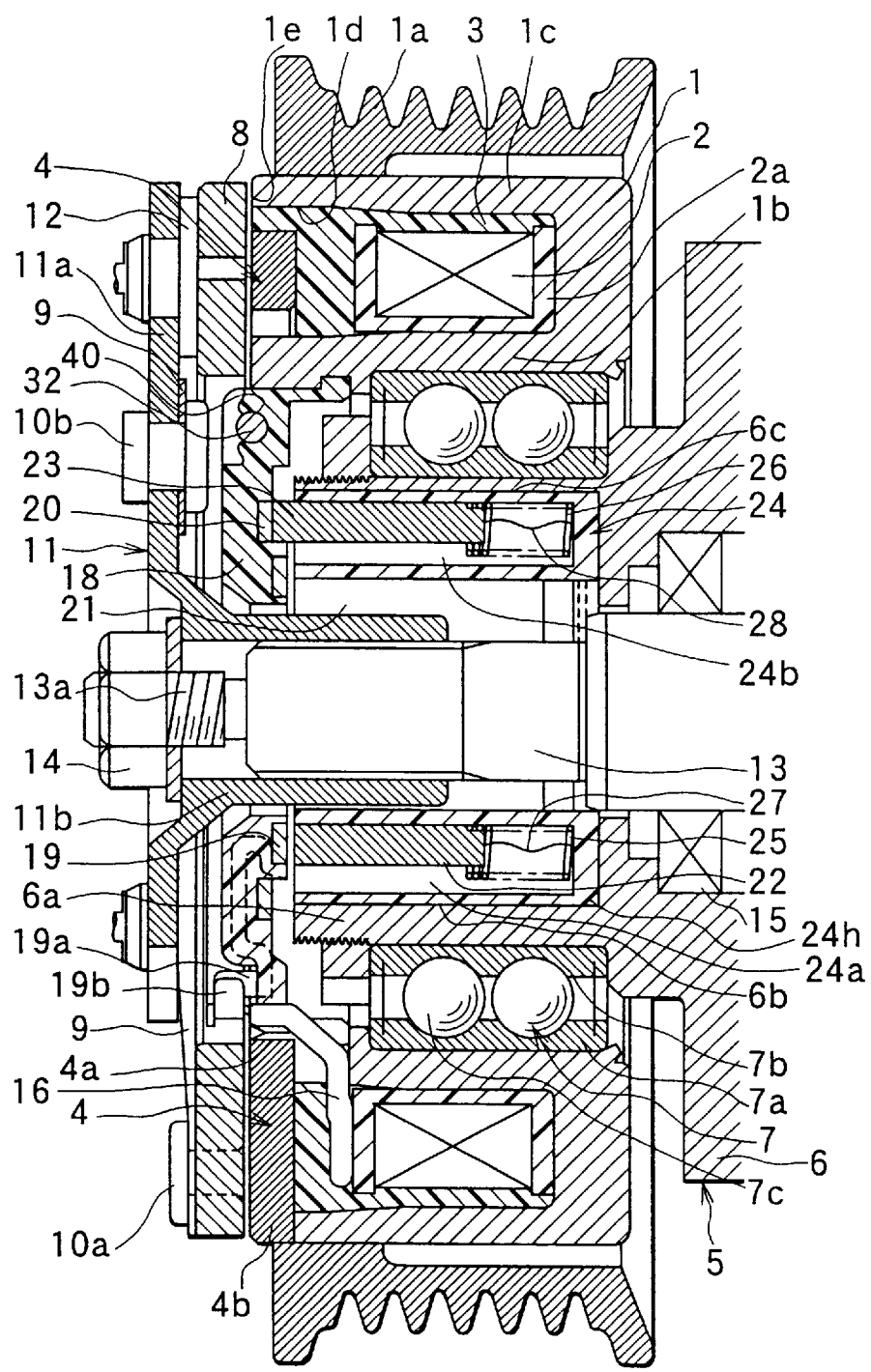
FIG. 10 is a cross-sectional view showing an electromagnetic clutch (fourth embodiment)
Figure 11:
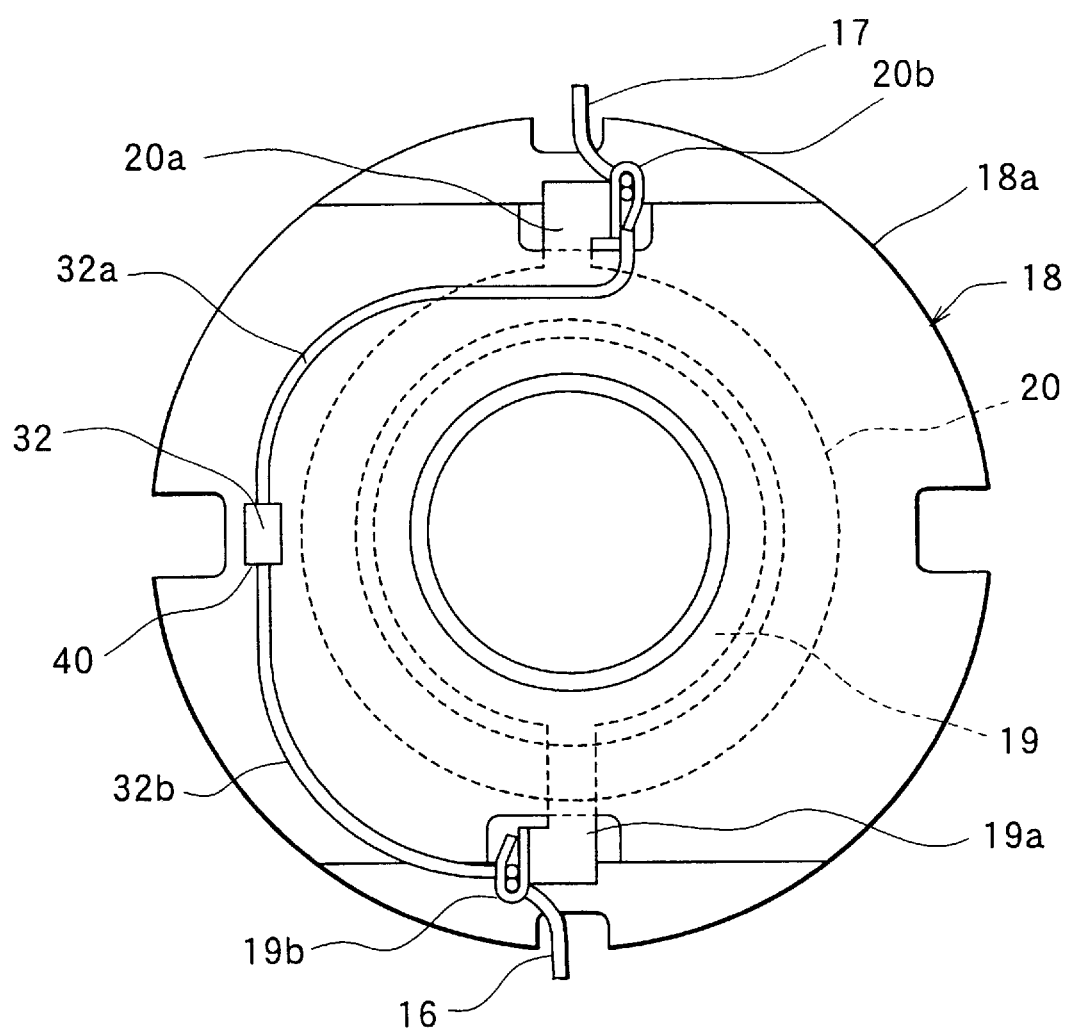
FIG. 11 is a back view showing a brush supporter (fourth embodiment)

In the fourth embodiment, as shown in FIGS. 10 and 11, the diode 32 is supported in the slip-ring supporter 18. FIG. 10 shows a cross-sectional view of the electromagnetic clutch according to the fourth embodiment, and FIG. 11 is a front view showing the slip-ring supporter 18 when viewed from the left side in FIG. 10. As described above, the positive and negative slip-rings 19, 20 are insert-formed in the slip-ring supporter 18. The positive slip-ring 19 integrally includes a positive electrode terminal 19a, and the negative slip-ring 20 integrally includes a negative electrode terminal 20a.

A concave portion 40 into which the diode 32 is installed is formed at the front surface, i.e., the armature 8 side surface, of the slip-ring supporter 18. The concave portion 40 is, as shown in FIG. 11, disposed centrally between the positive electrode terminal 19a and the negative electrode terminal 20a, which are positioned at 180 degree intervals. The diode 32 is press-inserted into the concave portion 40.

The positive lead 32a of the diode 32 is connected to the bent portion 20b of the negative electrode terminal 20a, and the negative lead 32b of the diode 32 is connected to the bent portion 19b of the positive electrode terminal 19a. Both leads 32a and 32b of the diode 32 are mechanically and electrically connected to the bent portions 19b and 20b at the same time that the leads 16 and 17 are connected to the bent portions 19b and 20b.

(Fifth Embodiment)

Figure 12:
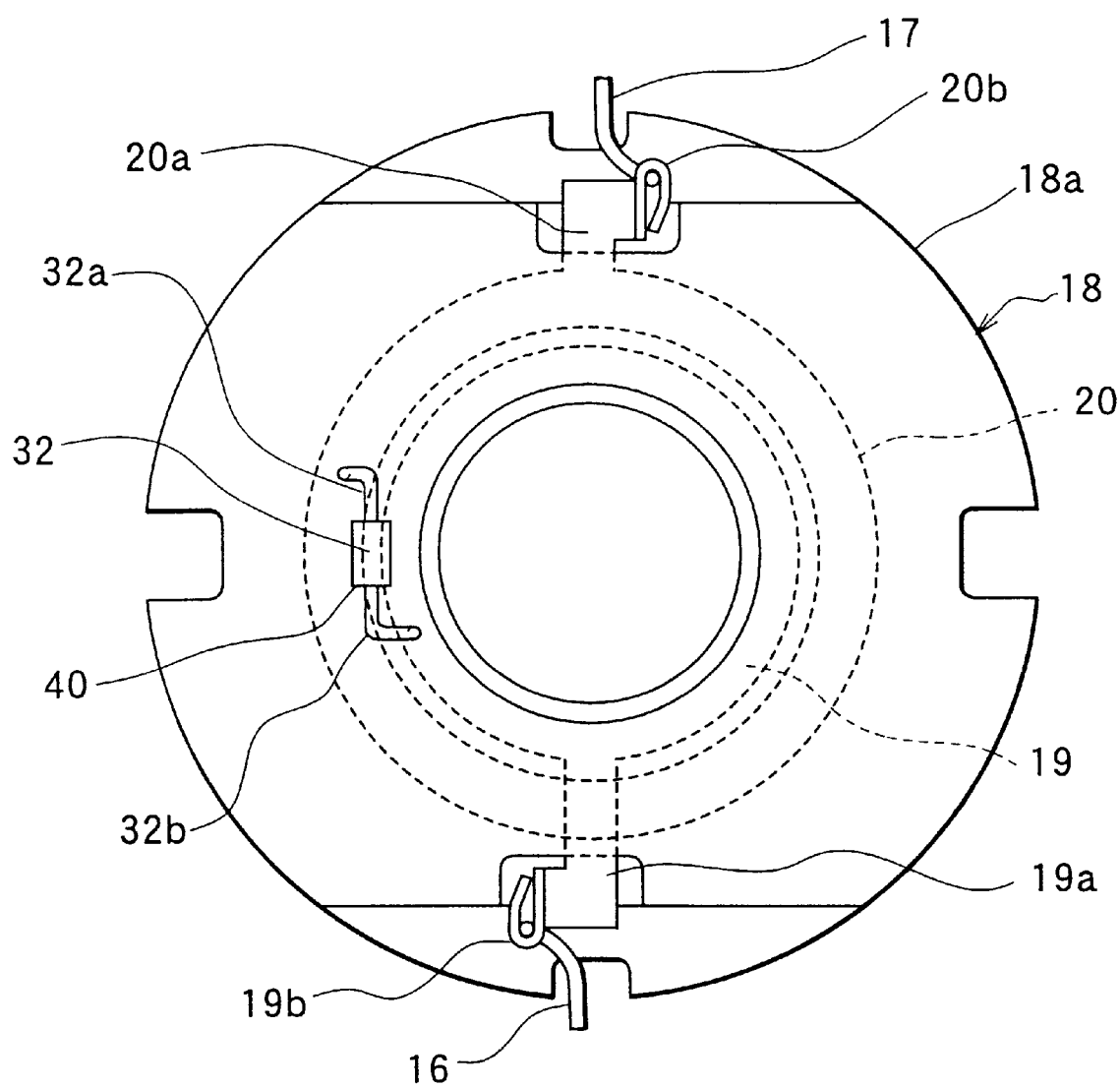
FIG. 12 is a back view showing a brush supporter (fifth embodiment)

In the fifth embodiment, as shown in FIG. 12, the leads 32a and 32b of the diode 32 are directly electrically connected to the slip-rings 19 and 20. That is, the leads 32a and 32b are not connected to the terminals 19a and 20a.

The slip-ring supporter 18 includes holes through which the leads 32a and 32b penetrate. The positive lead 32a penetrates through one hole and is electrically welded to the negative slip-ring 20. The negative lead 32b penetrates through another hole and is electrically welded to the positive slip-ring 19. Electric insulation material is coated around the connection points of the leads 32a and 32b to electrically insulate them from outside.

(Sixth Embodiment)

Figure 13:
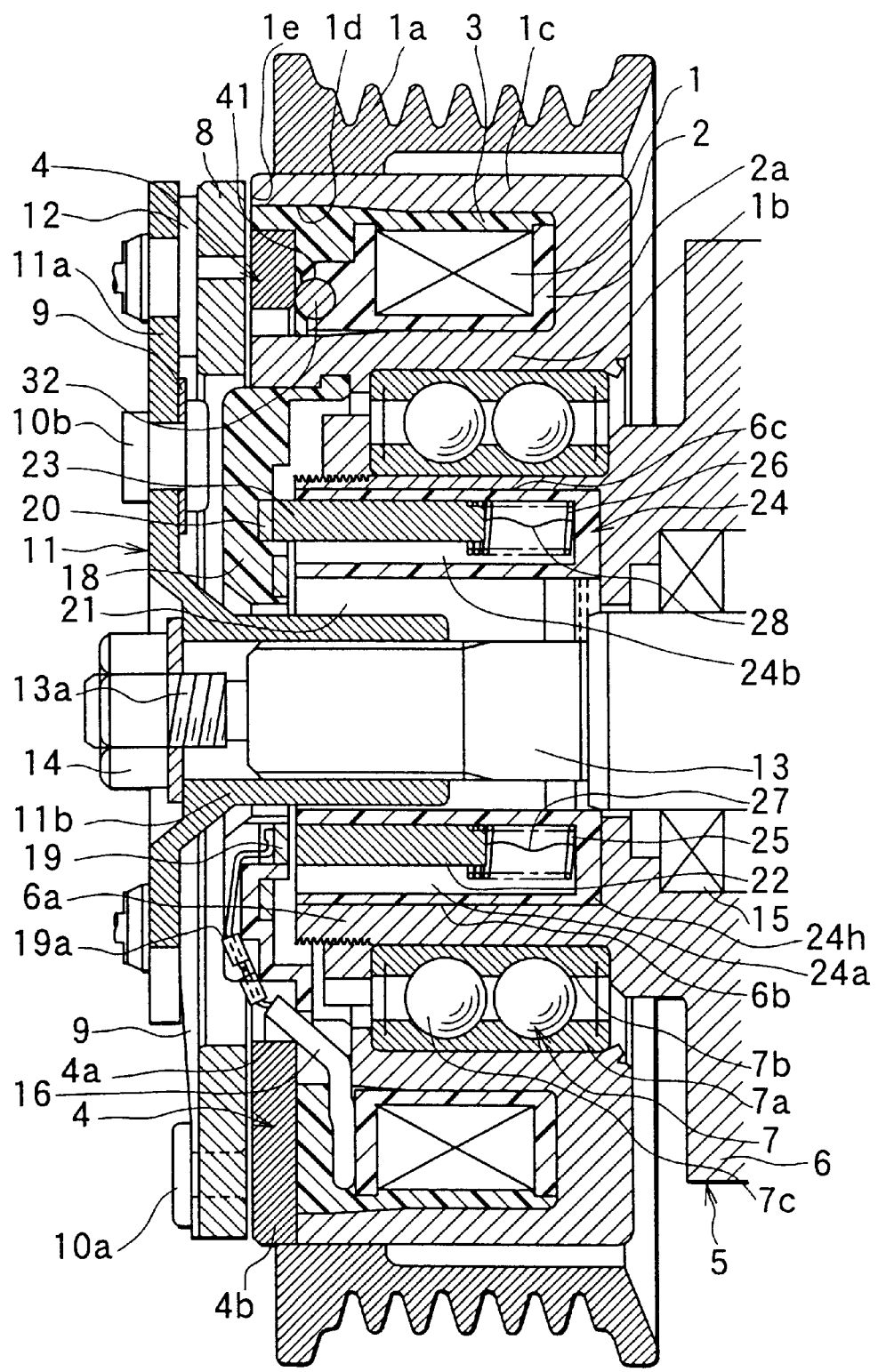
FIG. 13 is a cross-sectional view showing an electromagnetic clutch (sixth embodiment)

In the sixth embodiment, as shown in FIG. 13, the diode 32 is disposed near the electromagnetic coil 2 in the rotor 1.

The winding starting and the winding ending terminals of the electromagnetic coil 2 are positioned at the armature 8 side of the bobbin 2a. The bobbin 2a includes a concave portion 41 into which the diode 32 is installed at the armature 8 side thereof. The diode 32 is press-installed in the concave portion 41.

The leads 32a and 32b of the diode 32 are easily soldered to the winding starting and ending terminals of the coil 2, because the terminals are placed adjacent thereto. Here, the leads 32a and 32b, the winding starting and ending terminals, and the leads 16 and 17 to the slip-rings are connected at the same time.

As shown in FIG. 13, the positive electrode terminal 19a separated from the positive slip-ring 19 is provided in the slip-ring supporter 18. The positive lead 16 connected to the coil 2 is electrically connected to the positive electrode terminal 19a. The positive electrode terminal 19a electrically press-contacts the positive slip-ring 19. Similarly, the negative electrode terminal 20a separated from the positive slip-ring 20 is provided in the slip-ring supporter 18. The negative lead 17 is electrically connected to the negative slip-ring 20 through the negative electrode terminal 20a.

In this way, in the present invention, the leads 16 and 17 may be connected to the slip-rings 19 and 20 by using the terminals 19a and 20a separated from the slip-rings 19 and 20.

(Seventh Embodiment)

Figure 14:
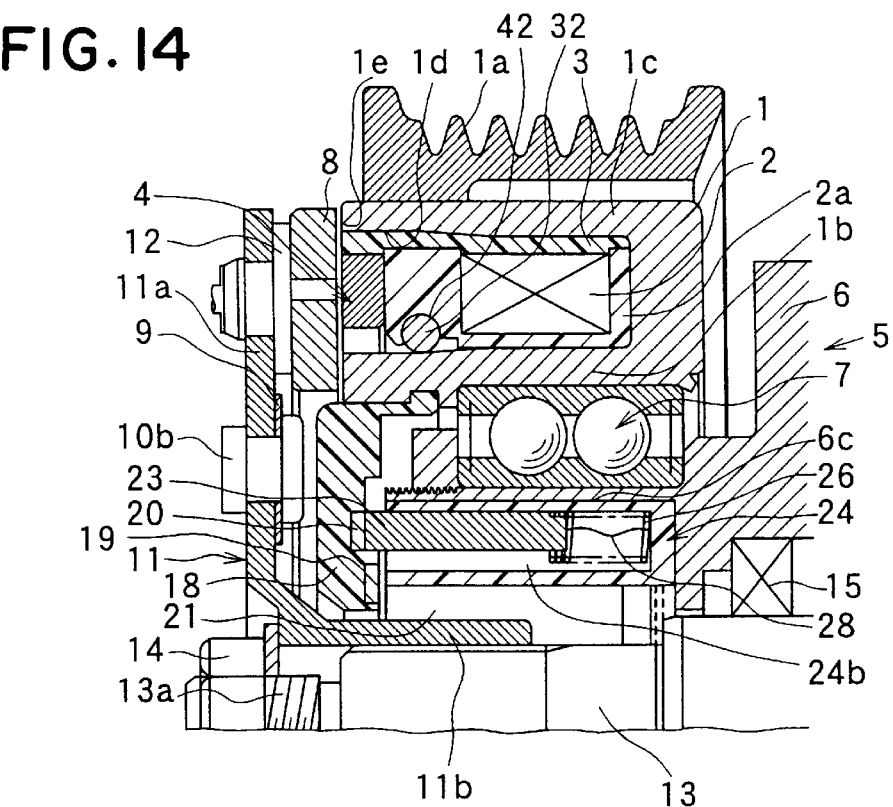
FIG. 14 is a cross-sectional view showing an electromagnetic clutch (seventh embodiment)

In the seventh embodiment, as shown in FIG. 14, a concave portion 42 into which the diode 32 is installed is formed at the front side (the armature 8 side) inner periphery of the bobbin 2a. The diode 32 is press-installed in the concave portion 42.

(Eighth Embodiment)

Figure 15:
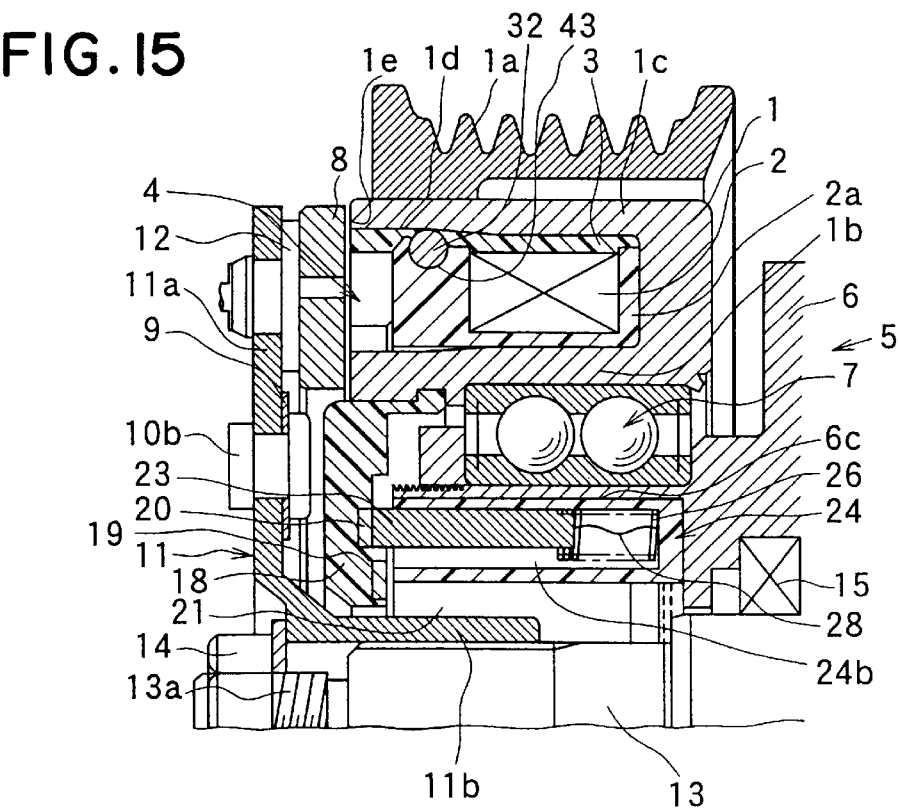
FIG. 15 is a cross-sectional view showing an electromagnetic clutch (eighth embodiment).

In the eighth embodiment, as shown in FIG. 15, a concave portion 43 into which the diode 32 is installed is formed at the front side (the armature 8 side) outer periphery of the bobbin 2a. The diode 32 is press-installed in the concave portion 43.

As described in the sixth through eighth embodiments, the diode 32 may be disposed at several positions near the electromagnetic coil 2.

(Modifications)

The brushes 22 and 23 need not have a cross-sectional arc shape, and alternatively may be another shape. Further, the brushes 22 and 23 need not be symmetrically disposed at 180 degree intervals, and alternatively may be disposed at any position.

In the above-described embodiments, the present invention is applied to a rotating coil electromagnetic clutch in which the electromagnetic coil 2 is provided in the rotor 1. However, the present invention may alternatively be applied to other rotating coil electromagnetic clutches. In another type of clutch, the electromagnetic coil 2 is provided in the hub 11 connected to the rotation shaft 13 of the compressor 5. The armature 8 is connected to the rotor 1 through the plate spring 9. The armature 8 is coupled with the hub 11 due to the electromagnetic force of the coil 2. The rotation of the rotor 1 is transmitted to the rotational shaft 13 through the armature 8 and the hub 11.

The positions of the positive and negative electrode elements described in the above embodiments may be exchanged with each other.

The layout of electric circuit supplying current to the electromagnetic coil 2 is not restricted to the above-described embodiments.

In the above-described embodiments, the leads are crimped and soldered to the terminals 19a, 20a, 29 and 30. Alternatively, the leads may be merely crimped or merely soldered or fused to the terminals 19a, 20, 29 and 30.

In the above-described embodiments, the diode 32 is used as a surge voltage absorption element. Alternatively, another element may be used as a surge voltage absorption element instead of the diode 32.

In the above-described embodiments, the slip-ring rotates and the brushes are fixed. Alternatively, the clutch may have rotating brushes and fixed slip-rings.

What is claimed is:

1. An electromagnetic clutch comprising:
   a rotor;
   an electromagnetic coil;
   an armature selectively coupled to said rotor when said electromagnetic coil is energized, said electromagnetic coil being coupled for rotation to one of said rotor and said armature;
   a fixed member;
   a slip-ring supporter fixed to one of the rotating portion and the fixed member;
   a slip-ring attached to said slip-ring supporter;
   a brush supporter fixed to the other of the rotating portion and the fixed member;
   a brush attached to said brush supporter and supplying electric current to said slip-ring; and
   a surge voltage absorbing element disposed in one of said brush supporter and said slip-ring supporter, said surge voltage absorbing element absorbing a surge voltage which is induced when said electromagnetic clutch is deenergized.

2. An electromagnetic clutch comprising:
   a rotor;
   an electromagnetic coil disposed in said rotor;
   an armature selectively coupled to said rotor when said electromagnetic coil is energized;
   a fixed member;
   a slip-ring rotating with said rotor;
   a slip-ring supporter fixed to said rotor and supporting said slip-ring;
   a brush supplying electric current to said slip-ring;
   a brush supporter fixed to said fixed member and supporting said brush, and
   a surge voltage absorbing element disposed in said brush supporter, said surge voltage absorbing element absorbing a surge voltage which is induced when said electromagnetic coil is deenergized.

3. An electromagnetic clutch according to claim 2, wherein said brush supporter is disposed between an inner periphery of a cylindrical boss portion axially protruding from a housing of a rotary machine and a rotational shaft of the rotary machine.

4. An electromagnetic clutch according to claim 2, wherein
   said brush supporter includes a concave portion, and
   said surge voltage absorbing element is installed to said concave portion.

5. An electromagnetic clutch according to claim 2, wherein
   said brush includes a positive side brush having a positive side lead and a negative side brush having a negative side lead;
   said brush supporter includes a positive side segment to which said positive side lead is connected, and a negative side segment to which said negative side lead is connected; and
   said surge voltage absorbing element includes a positive lead connected to said negative side segment, and a negative lead connected to said positive side segment.

6. An electromagnetic clutch according to claim 1, wherein said surge voltage absorbing element is a diode.

7. An electromagnetic clutch transmitting a rotational force to a rotational shaft of a rotary machine comprising:
   a rotor;
   an electromagnetic coil disposed in said rotor;
   an armature selectively coupled to said rotor when said electromagnetic coil is energized;
   a fixed member;
   a slip-ring rotating with said rotor;
   a slip-ring supporter fixed to said rotor and supporting said slip-ring;
   a brush supplying an electric current to said slip-ring;
   a brush supporter fixed to said fixed member and supporting said brush, and
   a surge voltage absorbing element disposed in said slip-ring supporter, said surge voltage absorbing element absorbing a surge voltage which is induced when said electromagnetic coil is deenergized.

8. An electromagnetic clutch according to claim 7, wherein said slip-ring supporter is ring-shaped, and disposed between an inner periphery of said rotor and an outer periphery of said rotational shaft.

9. An electromagnetic clutch according to claim 7, wherein
   said slip-ring includes a positive slip-ring and a negative slip-ring;
   said slip-ring supporter includes a positive electrode terminal connected to said positive slip-ring, and a negative electrode terminal connected to said negative slip-ring;
   said electromagnetic coil includes a positive electrode side lead connected to said positive electrode terminal, and a negative electrode side lead connected to said negative electrode terminal, and said surge voltage absorbing element includes a positive lead connected to said negative electrode terminal, and a negative lead connected to said positive electrode terminal.

10. An electromagnetic clutch according to claim 7, wherein said slip-ring supporter includes a concave portion, and said surge voltage absorbing element is installed in said concave portion.

11. An electromagnetic clutch according to claim 7, wherein said surge voltage absorbing element is a diode.

12. An electromagnetic clutch transmitting a rotational force to a rotational shaft of a rotary machine comprising:

a rotor;

an electromagnetic coil disposed in said rotor;

an armature selectively coupled to said rotor when said electromagnetic coil is energized;

a fixed member fixed to said rotary machine;

a slip-ring rotating with said rotor;

a slip-ring supporter fixed to said rotor and supporting said slip-ring;

a brush supplying an electric current to said slip-ring;

a brush supporter fixed to said fixed member and supporting said brush, and a surge voltage absorbing element disposed abutting to said electromagnetic coil in said rotor, said surge voltage absorbing element absorbing a surge voltage which is inducted when said electromagnetic coil is disenergized.

13. An electromagnetic clutch according to claim 12, wherein said electromagnetic coil is wound around a bobbin made of resin;

said bobbin includes a concave portion; and said surge voltage absorbing element is installed in said concave portion.

* * * * *